United States Patent Office 3,531,532
Patented Sept. 29, 1970

---

3,531,532
NOVEL FRAGRANCE MATERIALS AND PROCESSES
James D. Grossman, Madison Township, Middlesex County, N.J., assignor to International Flavors & Fragrances Inc., New York, N.Y., a corporation of New York
No Drawing. Filed Oct. 8, 1968, Ser. No. 765,992
Int. Cl. C07c 43/18
U.S. Cl. 260—611                                  6 Claims

ABSTRACT OF THE DISCLOSURE

Lower alkyl ethers of dihydrocaryophyllene alcohol and dihydroisocaryophyllene alcohol and their use in perfume and fragrance compositions, and articles containing same.

BACKGROUND OF THE INVENTION

Caryophyllene is a naturally occurring material found in oil of cloves, as obtained from the flower-heads of *Eugenia caryophyllata*. It is a sesquiterpene material which is also found in certain species of the genus Pinus. The elucidation of the caryophyllene structure has received attention, and Ramage & Whitehead show the structure of both normal (β-caryophyllene) and isocaryophyllene (γ-caryophyllene) in J. Chem. Soc. Part IV, 4336 et seq. (1954). It is known to obtain epoxides of both the above-mentioned caryophyllenes by treatment of these materials with peracids and then to reduce the epoxides to the corresponding alcohols.

THE INVENTION

Briefly, the present invention provides lower alkyl ethers of dihydro caryophyllene alcohol and dihydro isocaryophyllene alcohol having the formula:

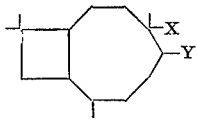

wherein one of X and Y is lower alkoxy and the other is hydrogen, together with processes for preparing such alkyl ethers. This invention also contemplates perfume and fragrance compositions comprising the novel ethers as well as performed articles containing the novel ethers and such perfume and fragrance compositions. The novel ethers according to the present invention possess an exceptionally fine woody-tobacco aroma.

More specifically, the present invention provides two preferred ethers, namely:

6-methoxy-2,6,10,10-tetramethyl[7.2.0]undecane (I) having the formula:

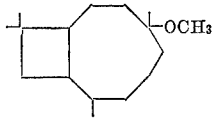

and 5-methoxy-2,6,10,10-tetramethyl[7.2.0]undecane (II) having the formula:

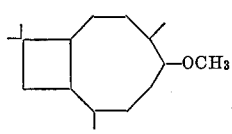

It will be understood from the present description that the novel ethers according to this invention can exist in several isomeric forms depending upon the orientation of substituents on the larger ring, and the formulas given herein comprehend such isomers. Thus, the methyl groups substituent on the larger ring can be above or below the plane of the ring to which they are attached, and the alkoxy group can be similarly bonded either above or below the plane of the larger ring. Accordingly, there are four possible diastereoisomers of I and eight possible diastereoisomers of II.

The starting materials used in the preparation of the ethers of this invention are the two dihydro alcohols which can ultimately be derived from caryophyllene or isocaryophyllene as further described hereinafter. The ethers are obtained from the alcohols by treatment with a metal hydride followed by treatment with an alkyl sulfate or halide.

The starting material for use in the present invention can be either caryophyllene (III) having the formula:

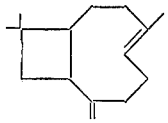

or isocaryophyllene (IV) having the formula:

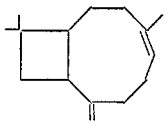

When the desired starting material is isocaryophyllene, it is obtained from caryophyllene by well known methods, such as photochemically by the method of Schulte-Elte et al., Helv. Chem., Acta, vol. 51, Fasc. 3, pp. 494–505 (1968), or by treatment with nitrous acid. It is preferred that the caryophyllene and isocaryophyllene utilized in the present invention be refined to a purity of at least 90% to minimize the formation of undesired by-products which complicate recovery and reduce the odor intensity of the finished ethers.

According to the present invention, the caryophyllene or isocaryophyllene ultimate starting material is treated with a peracid to form epoxides. Suitable peracids include aromatic peracids such as perphthalic acid, perbenzoic acid, and the like, as well as aliphatic peracids, especially lower aliphatic peracids such as peracetic acid, perpropionic acid, and the like. It will be understood from the present description that the peracid can be formed in situ by the use of a suitable organic anhydride and concentrated hydrogen peroxide, that is, hydrogen peroxide having a strength of about 30% or greater. For instance, acetic anhydride and concentrated hydrogen peroxide can be used in lieu of peracetic acid. The oxidation reaction is preferably carried out in the presence of a buffer material, such as an alkali-metal salt of an organic acid. All parts, proportions, percentages and ratios herein are by weight, unless otherwise indicated.

The oxidation reaction is desirably carried out at low temperatures, i.e., below normal room temperature, to obtain a better yield by minimizing formation of unwanted by-products. Accordingly, the reaction can be carried out at temperatures of from −25° C. to 10° C. It has been found preferable to maintain the reaction mixtures at 0° to 5° C. After the addition of the peracid is complete, the temperature can be permitted to rise slowly to room temperature to ensure completeness of reaction.

After epoxidation the unsaturated epoxides are hydrogenated to obtain the corresponding saturated alcohol. It is preferred to carry out this hydrogenation with metallic catalysts, such as palladium, platinum, rhodium, Raney nickel, and the like. The metallic catalyst can be incorporated with an inert carrier such as carbon, calcium carbonate, and the like. A preferred catalyst is Raney nickel. The amount of catalyst used is from 0.1 to 10 percent of the caryophyllene epoxide or isocaryophyllene epoxide. If desired, the caryophyllene or isocaryophyllene epoxide isomers can be separated prior to hydrogenation and one or a combination of the isomers can be used.

The hydrogenation is carried out utilizing at least a stoichiometric amount of gaseous hydrogen, preferably in the presence of an inert vehicle. Hydrogen in excess of the stoichiometric quantity can be used, but no purpose is usually served by large excesses, and the use of substantially less than stoichiometric amounts leaves large quantities of unreacted or incompletely reacted caryophyllene epoxide or isocaryophyllene epoxide which must then be separated from the reaction mixture and reprocessed.

The hydrogenation is desirably carried out under atmospheric or higher pressures, preferably at superatmospheric pressures of from 100 to 300 p.s.i.g. The hydrogenation can be conducted on the purified caryophyllene epoxide or isocaryophyllene epoxide per se, but a reaction vehicle inert to both the hydrogen and the epoxides under the reaction conditions is preferably used. Accordingly, suitable reaction vehicles include alcohols such as methanol, ethanol, isopropanol, and the like, ethers such as ethyl ether, and the like, and hydrocarbons such as hexane, mineral oil, and the like. When hydrogenation is substantially complete, the dihydro alcohol produced is separated from the catalyst by suitable means such as settling, centrifugation, filtering, and the like.

After suitable purification, the dihydro alcohol is etherified. It will be appreciated by those skilled in the art that hydrogenation of the epoxide linkage and production of the alcohol will result in the formation of both secondary and tertiary alcohols. In either event, the etherification will provide the corresponding ether.

The ethers are desirably prepared by treating the dihydro alcohols with an alkali-metal hydride to form the alcoholate and then treating the alcoholate with an alkyl sulfate or halide. Alkali-metal hydrides such as lithium hydride, sodium hydride, potassium hydride, and the like can be used. A preferred hydride for use in the present invention is sodium hydride. The amount of hydride should be about stoichiometric.

The preferred ethers of the dihydro alcohols according to the present invention are the lower alkyl ethers, desirably those having less than three carbon atoms. Accordingly, lower alkyl sulfates and halides such as methyl sulfate, ethyl sulfate, methyl bromide, ethyl chloride, methyl iodide, and the like are utilized. It will be apparent to those skilled in the art that mixed alkyl sulfates can be utilized, and this will provide a mixture of lower alkyl ethers. The preferred alkyl sulfate for use in the present invention is dimethyl sulfate. The quantity of alkyl sulfate or halide used should be at least stoichiometric, and is preferably in 10–20 percent molar excess.

It has been found desirable to use an inert reaction vehicle for the etherification. A wide variety of reaction vehicles can be utilized. The reaction vehicle must be inert to the reactants under the reaction conditions and desirably has a boiling point of 60°–150° C. such that the reaction temperature can conveniently be moderate and controlled. Suitable reaction vehicles accordingly include aromatic hydrocarbons such as benzene, toluene, xylene, and the like and aliphatic hydrocarbons such as hexane, octane, mineral oil, and the like.

While the etherification can be carried out at subatmospheric, atmospheric, or superatmospheric pressures, rarely is any advantage obtained by operating other than at atmospheric pressure. As indicated above, the reaction temperature is desirably controlled from about 60° to about 150° C., and it is particularly preferred to carry out the reaction at from about 110° to about 130° C.

Both steps of the etherification are carried out under entirely anhydrous conditions, and to this end the reactants should be anhydrous. In order to maintain rigorously anhydrous conditions during the etherification, it is preferably conducted under a dry inert gas, for example, nitrogen.

After alkylation of the alcoholate any unreacted alkylating agent is eliminated by treatment with an aqueous base. The finished ethers can then be isolated by conventional methods such as extraction, distillation, preparative chromatographic techniques, and the like. A preferred method of purifying the ethers obtained according to the present invention is by fractional distillation. It will be understood that the intermediate epoxides and dihydro alcohols can similarly be purified if desired.

When the dihydro alcohol obtained from caryophyllene is etherified, a mixture of ethers I and II is obtained. This mixture has a boiling point of 84–88° C. at 0.5 mm Hg, a refractive index $n_D^{20}$ of 1.4753, a density of 0.9156 at 25° C., and a specific rotation in sodium D light of $-23.52°$ at 25° C. The purified product has an excellent fine woody-tobacco fragrance character.

When the dihydro epoxide obtained from isocaryophyllene is etherified, a mixture of ethers I and II is obtained. This mixture has a boiling point of 80–84° C. at 0.15–0.30 mm. Hg, a refractive index $n_D^{20}$ of 1.4751, a density of 0.9125 at 25° C., and a specific rotation in sodium D light of $-6.64°$ at 25° C. This purified mixture has an excellent fine woody-tobacco fragrance character.

The novel ethers are very useful as olfactory agents and fragrances. These novel materials can impart their woody, tobacco fragrance notes to perfume compositions, fragrance compositions, and perfumed articles according to the present invention. They can be formulated into, or used as components of, perfume and fragrance compositions.

It will be understod that the ethers obtained according to the present invention can further be sepaarted into their individual components and that such components are also useful in preparation of perfume and fragrance compositions.

The term "perfume composition" is used herein to mean a mixture of natural and/or synthetic organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the ethers of this invention can be used singly or together to alter the aroma characteristics of a perfume composition, for example, by highlighting or moderating the olfactory reaction contributed by another ingredient in the composition.

The amount of the ethers of this invention which will be effective in perfume compositions depends on many factors, including the other ingredients, their amounts and the effects which are desired. It has been found that perfume compositions containing as little as 2% by weight of mixtures or compounds of this invention, or even less, can be used to impart a fine woody odor to soaps, cosmetics and other products. The amount employed can range up to 10% or higher and will depend on considerations of cost, nature of the end product, the effect desired on the finished product and the particular fragrance sought.

The ethers described herein can be used alone or in a perfume composition as olfactory components in detergents and soaps; space odorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, dusting powders, face powder; and the like. When used as an olfactory component of a perfumed article, as little as 0.010% of the novel ethers will suffice to impart a woody, tobacco-like odor character.

It will be understood from the present description that the isomer mixture mentioned above can be resolved into its components and that these components are also useful in perfumery.

In addition, the perfume composition can contain a vehicle or carrier for other ingredients. The vehicle can be a liquid such as alcohol, glycol, or the like. The carrier can be an absorbent or adsorbent solid such as a gum or components for encapsulating the composition. The examples which appear hereinbelow illustrate perfume mixtures, soaps and other formulations within the scope of this invention.

The following examples are given to illustrate embodiments of the invention as it is presently preferred to practice it. It will be understood that these examples are illustrative, and the invention is not to be considered as restricted thereto except as indicated in the appended claims.

EXAMPLE I

Caryophyllene alcohol ethers

*Alcohol preparation.*—Dihydrocaryophyllene alcohol is prepared by hydrogenating 2 kg. of epoxidized caryophyllene in the presence of 200 g. of Raney nickel and 200 g. of isopropyl alcohol as a solvent. The hydrogenation is carried out at 500–1000 p.s.i.g. and 50–90° C. for five hours. The catalyst is removed by filtration and the solvent is stripped off.

The product is then purified by fractional distillation at reduced pressure (0.5–0.9 mm. Hg). The product has a boiling point of 39–117° C. at 0.65–0.9 mm. Hg and is of sufficient purity for conversion to the lower alkyl ether.

*Ether preparation.*—A suspension of 310 g. of commercial sodium hydride (52% in mineral oil) is heated in 2200 cc. of toluene under a nitrogen atmosphere. At reflux temperature a solution of 1386 g. of dihydrocaryophyllene alcohols produced above and 1100 cc. of toluene is introduced into the refluxing mass with efficient stirring. Reflux of the mixture and the stirring are continued until the theoretical amount (136 liters) of hydrogen is evolved.

The reaction mass is maintained at reflux while 860 g. of dimethyl sulfate is added over two hours. After addition is complete reflux is continued for another fifty minutes. The reaction mixture is cooled to 25° C. and poured into two liters of cold 10% aqueous sodium hydroxide. The upper layer of ether product in toluene is washed with an equal volume of saturated aqueous sodium chloride. Toluene is recovered under a pressure of 50 mm. Hg, and the remaining 1400 g. of crude product is purified by fractional distillation utilizing 15 g. of triethanolamine in the distillation flask.

The product obtained from the distillation has a fine woody, tobacco aroma. The liquid has a boiling point of 84–88° C. at 0.5 mm. Hg, and $n_D^{20}$ of 1.4753, a specific gravity of 0.9156 at 25° C., and an $[\alpha]_D^{25}$ of −23.52°.

EXAMPLE II

Isocaryophyllene alcohol ethers

*Alcohol preparation.*—Isocaryophyllene epoxides (883 g.) are hydrogenated using 90 g. of Raney nickel catalyst and 225 g. of isopropyl alcohol as solvent. The hydrogenation is carried out at 500–1100 p.s.i.g. and 35–95° C. for five hours. The catalyst is thereupon removed by filtration and the product is purified by fractional distillation after the solvent has been stripped off. The product has a boiling point of 96–110° C. at 1.0–0.9 mm. Hg.

*Ether preparation.*—A suspension of 110 g. of sodium hydride (52% in mineral oil) in 700 cc. of toluene is heated to reflux. At reflux a solution of 493 g. of dihydroisocaryophyllene alcohol, produced above, in 400 cc. of toluene is added. The mixture is then refluxed for ten hours.

Thereupon the reflux is continued while 302.3 g. of dimethyl sulfate is added over two hours. After an additional thirty minutes of reflux, the reaction mixture is cooled and poured into 2 liters of cold 10% aqueous sodium hydroxide. The top layer containing toluene and produce is separated and washed with an equal volume of sodium chloride solution. The toluene is evaporated from the product at 50 mm. Hg to obtain 530 g. of crude material which is then purified by fractional distillation.

The finished product is a mixture of ethers I and II with a boiling point of 80–84° C. at 0.15–0.3 mm. Hg, $n_D^{20}$ of 1.4751, a density of 0.9125 at 25° C., and an $[\alpha]_D^{25}$ of −6.64°.

It will be understood by those skilled in the art that the preceding examples can be carried out with ethyl and other lower alkyl sulfates or ethyl bromide, ethyl chloride, ethyl iodide and other lower alkyl halides to obtain the corresponding ethers.

The mixtures of ethers produced above can be separated into individual isomers, and these individual isomers are also useful in the preparation of perfume and fragrance materials.

EXAMPLE III

Perfume composition

A perfume composition is prepared with the following ingredients:

| Ingredient: | Parts |
| --- | --- |
| Vetivert oil | 40 |
| Methyl ether obtained from Example I | 85 |
| Sandalwood oil | 100 |
| Rose geranium oil | 200 |
| Musk ambrette | 25 |
| Benzyl-iso-eugenol | 100 |
| Coumarin | 100 |
| Heliotropin | 50 |
| Bois de rose oil | 200 |
| Benzoin resin | 100 |
| | 1000 |

The perfume composition exhibits an excellent woody fragrance. When the novel ether is omitted, the composition lacks the woody fullness of the complete perfume composition of this example.

In comparison with caryophyllene alcohol and dihydrocaryophyllene alcohol, the novel ether is surprisingly found to have a much stronger, richer woody, tobacco odor character which renders it highly useful in the preparation of fragrances and perfumes.

It will be understood from the present description that all the ethers can be used to provide a rich, woody fragrance character to a broad array of perfumed articles. Several examples of such articles and their preparation follow:

EXAMPLE IV

Preparation of soap composition

One hundred grams of soap chips are mixed with one gram of the perfume composition of Example III until perfumed soap composition manifests an excellent woody odor character.

EXAMPLE V

Preparation of a detergent composition

A total of 100 grams of a detergent powder is mixed with 0.15 grams of the ether obtained in Example II until a substantially homogeneous composition is obtained. This composition has an excellent woody odor.

EXAMPLE VI

Preparation of a cosmetic powder composition

A cosemtic powder is prepared by mixing in a ball mill 100 grams of talcum powder with 0.25 gram of the product obtained from the process of Example II. It has an excellent woody odor.

EXAMPLE VII

Perfumed liquid detergent

Concentrated liquid detergents with a rich woody odor are prepared containing 0.10%, 0.15%, and 0.20% of the ether mixture obtained in Example II. They are prepared by adding and homogeneously mixing the appropriate quantity of ether in the liquid detergent. The detergents all possess a woody fragrance, the intensity increasing with greater concentration of the ether mixture of this invention.

What is claimed is:

1. Alkyl ethers having the formula:

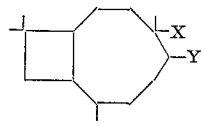

wherein one of X and Y is lower alkoxy having less than three carbon atoms and the other is hydrogen, and mixtures thereof.

2. A mixture of ethers having the Formula I

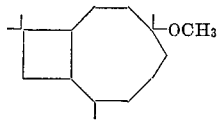

and II

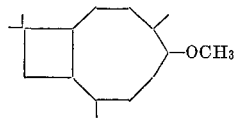

3. A process for the preparation of alkyl ethers of caryophyllene and isocaryophyllene which comprises treating dihydro isocaryophyllene alcohol or dihydro caryophyllene alcohol with an alkali-metal hydride to form an alcoholate and treating the alcoholate with an alkylating agent to form the lower alkyl ether.

4. A process according to claim 3 wherein the alkylating agent is a lower alkyl sulfate or a lower alkyl halide.

5. A process according to claim 3 wherein the alkylating agent is dimethyl sulfate.

6. A process according to claim 3 wherein the hydride is sodium hydride.

References Cited

UNITED STATES PATENTS 3,265,689   8/1966   Hafner et al.

BERNARD HELFIN, Primary Examiner

U.S. Cl. X.R.

252—522; 424—69